United States Patent Office 2,801,004
Patented July 30, 1957

2,801,004

FERTILIZER FLOTATION SOAP (TALL OIL)

William A. Hodges, Plant City, and Joseph E. Floyd, Fort Meade, Fla., assignors to Swift & Company, Chicago, Ill., a corporation of Illinois No Drawing. Application September 9, 1955,
Serial No. 533,523

10 Claims. (Cl. 209—167)

The present invention, which is a continuation-in-part of our earlier application, Serial No. 294,723, filed June 20, 1952, and now abandoned, relates in general to the recovery of oxides of alkaline earth metals from their ores and, more particularly, to an improved reagent and method of using the same in such recovery.

The use of recovery methods such as froth flotation or agglomeration in recovering phosphate values or the like is highly developed, and many reagents have heretofore been proposed which possess a selectivity for phosphate values or the like. Among the most widely used of these reagents has been tall oil. Tall oil is the refined product obtained by acid treatment of the black liquor soap skimmings, produced as a by-product of the sulfate process for the manufacture of cellulose and paper. In this process, wood chips are digested with various alkalies including caustic soda and other chemicals under pressure. About one-half of the wood is dissolved to produce a black liquor containing excess chemicals and also fats and resins in the form of sodium soap. When this black liquor is evaporated, a scum, known as tall oil soap or black liquor soap skimmings, separates and floats on the surface of the black liquor. This black liquor soap skimmings is removed and then treated with a mineral acid, usually sulfuric acid, and refined to remove ligneous and other insoluble material to produce so-called "tall oil." This treatment has been considered necessary in order to produce a product having any commercial possibilities. Typical of the general knowledge and belief in the art is the statement appearing in U. S. Patent No. 2,165,268, wherein it is stated: "... black liquor soap ... contains ligneous matter and other impurities which render it unsatisfactory as a flotation reagent."

It is therefore an object of the present invention to provide a method for treating black liquor soap skimmings to produce a product which may be used directly as a mineral-recovery reagent.

A further object of the present invention is to provide a new reagent for the recovery of alkaline earth oxide ore values.

Additional objects, if not specifically set forth herein, will be readily apparent to one skilled in the art from the following detailed description of the invention:

It has now been found that black liquor soap skimmings may be so treated as to produce an improved and highly effective mineral-recovery reagent without the necessity for the acid-refining heretofore used by the art. More particularly, it has been found that when black liquor soap skimmings are treated as hereinafter described, and the conditions of pH and specific gravity prescribed carefully maintained, a new reagent is produced which is effective in the recovery of mineral values such as phosphate or the like by either flotation processes or agglomeration processes.

More specifically, black liquor soap skimmings may be described as a dark, viscous paste produced as a by-product of the soda and sulfate paper pulp industry. These soap skimmings contain about 45–55% fatty and rosin acids in the form of soap. They also contain a substantial percentage of free alkaline values as well as a considerable amount of black liquor. It has now been found that by treating black liquor soap skimmings so as to regulate the pH thereof to within the range of from 9.5 to 12.5 and preferably from 11.0 to 11.3, and to adjust the specific gravity to about 1.02–1.03, a reagent is produced which may be used with good success in the recovery of phosphate values or the like. Black liquor soap skimmings are mixed in about a 1-to-1 ratio with water, and sufficient NaOH is added thereto to bring the pH within the desired range. The resulting liquid soap solution has a solids content of about 35% or more and may be used directly in phosphate-recovery methods.

It has been determined that this reagent is satisfactory both in conventional froth-flotation processes and also in agglomeration by the use of a shaking table, under-water agglomeration screens, and/or spiral classifiers. The reagent consumption, based on the initial black liquor soap skimmings itself, will be about 1.8 times that of the refined tall oil. However, this increase in reagent consumption is off-set by the considerably lower cost of the reagent and an overall reduction of caustic consumption in the plants.

The following examples are furnished for the purpose of illustration only, and are not to be construed as placing any limitations on the scope of the present invention:

EXAMPLE I

A deslimed phosphatic feed was subjected to a conventional flotation operation wherein the feed was first treated with negative ion, phosphate-selective reagents to produce a rougher concentrate, the rougher concentrate then redispersed and refrothed in a secondary flotation cell, and the discharge from this secondary cell subjected to a silica float with positive ion reagents. In this test, two runs were conducted utilizing a conventional tall oil-fuel oil-caustic soda mixture as phosphate flotation reagents. Two additional runs were conducted utilizing the improved reagent of the present invention, i. e. black liquor soap skimmings adjusted to a pH within the range 11.0–11.3 and having a specific gravity of 1.02, substituted for the conventional refined tall oil. Runs 1 and 2 in the table below illustrate the conventional process utilizing refined tall oil. Runs 3 and 4 illustrate the present method using the improved reagent of the instant invention (identified in table as B. L. reagent):

Reagents (pounds per ton of feed)

| | Run 1 | Run 2 | | Run 3 | Run 4 |
|---|---|---|---|---|---|
| NaOH | 0.35 | 0.35 | NaOH | 0.25 | 0.25 |
| Tall Oil | 0.52 | 0.75 | B. L. Reagent | 0.90 | 1.88 |
| Fuel Oil | 1.57 | 1.57 | Fuel Oil | 1.57 | 1.57 |
| $H_2SO_4$* | 3.00 | 3.00 | $H_2SO_4$* | 3.00 | 3.00 |
| NaOH* | 0.10 | 0.10 | NaOH* | 0.10 | 0.10 |
| Amine* | 0.16 | 0.16 | Amine* | 0.16 | 0.16 |
| Frother* | 0.16 | 0.16 | Frother* | 0.16 | 0.16 |

*These reagents are used in the silica flotation.

Metallurgical results

| | Run 1 | Run 2 | Run 3 | Run 4 |
|---|---|---|---|---|
| Percentage Conc | 36.2 | 40.1 | 41.3 | 42.1 |
| Percentage Silica Float Tailings | 3.1 | 6.0 | 7.5 | 12.1 |
| Percentage Primary Float Tailings | 60.7 | 53.9 | 51.2 | 45.8 |
| B. P. L. Concentrates | 78.5 | 78.0 | 77.81 | 77.30 |
| B. P. L. Silica Float Tailings | 21.84 | 14.36 | 8.93 | 7.34 |
| B. P. L. Primary Float Tailings | 7.10 | 4.0 | 3.65 | 2.51 |
| $SiO_2$ Concentrates | 1.84 | 2.46 | 2.70 | 3.27 |
| Percentage B. P. L. Recovery | 85.00 | 91.30 | 92.50 | 94.10 |

EXAMPLE II

A froth-flotation of phosphatic feed was conducted in a manner similar to that described in Example I with the following results—run 5 representing a conventional use of refined tall oil, the runs 6 and 7 illustrating the use of the improved reagent of the present invention (identified in table as B. L. reagent):

*Reagents (pounds per ton of feed)*

|  | Run 5 | Run 6 | Run 7 |
|---|---|---|---|
| NaOH | 0.50 | 0.40 | 0.40 |
| Tall Oil | 0.90 |  |  |
| B. L. Reagent |  | 1.98 | 1.34 |
| Fuel Oil | 2.63 | 2.63 | 2.63 |
| $H_2SO_4$* | 3.00 | 3.00 | 3.00 |
| NaOH* | 0.10 | 0.10 | 0.10 |
| Amine* | 0.16 | 0.16 | 0.16 |
| Frother* | 0.16 | 0.16 | 0.16 |

*Reagents used in silica flotation.

*Metallurgical results*

|  | Run 5 | Run 6 | Run 7 |
|---|---|---|---|
| Percentage Concentrate | 45.37 | 45.50 | 44.91 |
| Percentage Silica Float Tailings | 7.36 | 9.35 | 7.12 |
| Percentage Primary Float Tailings | 47.37 | 45.15 | 47.97 |
| B. P. L. Concentrates | 71.75 | 71.80 | 71.89 |
| B. P. L. Silica Float Tailings | 15.99 | 14.50 | 15.46 |
| B. P. L. Primary Float Tailings | 3.80 | 4.11 | 5.24 |
| $SiO_2$ Concentrates | 2.78 | 2.72 | 2.61 |
| Percentage B. P. L. Recovery | 91.60 | 91.50 | 90.00 |

EXAMPLE III

A froth flotation was carried out in a plant test using a continuous flotation process, similar to that described in the laboratory results of Examples I and II, and conducted in the manner known to the art. Runs 1 and 2 below illustrate the conventional use of refined tall oil, while runs 3 and 4 illustrate the use of the black liquor soap skimmings reagent (B. L. reagent) of the present invention:

*Reagents (grams per minute)*

|  | Run 1 | Run 2 | Run 3 | Run 4 |
|---|---|---|---|---|
| NaOH (100%) | 238 | 218 | 116 | 108 |
| Tall Oil | 540 | 620 |  |  |
| B. L. Reagent |  |  | 900 | 925 |
| Fuel Oil | 2,390 | 2,470 | 2,490 | 2,480 |

*Metallurgical results*

|  | Run 1 | | Run 2 | | Run 3 | | Run 4 | |
|---|---|---|---|---|---|---|---|---|
|  | BPL | $SiO_2$ | BPL | $SiO_2$ | BPL | $SiO_2$ | BPL | $SiO_2$ |
| Feed | 38.71 |  | 38.39 |  | 42.82 |  | 39.65 |  |
| Rougher Conc | 74.24 | 9.58 | 74.07 | 9.60 | 71.01 | 12.21 | 72.08 | 12.39 |
| Rougher Tails | 10.33 |  | 9.87 |  | 10.18 |  | 8.65 |  |
| Finished Conc | 78.41 | 3.08 | 78.07 | 4.35 | 78.85 | 3.24 | 78.33 |  |
| Silica Tails | 41.36 |  | 28.36 |  | 34.12 |  | 25.19 |  |
| Percent B. P. L. Rec. (Rougher Conc.) | 85.17 |  | 85.70 |  | 88.95 |  | 88.27 |  |
| Total Percent B. P. L. Recovered | 79.81 |  | 83.02 |  | 81.49 |  | 84.65 |  |

EXAMPLE IV

The improved reagent of the present invention was also tested in typical agglomeration processes on phosphatic ore. The deslimed phosphatic feed was mixed with the reagents set forth in the table below and then fed onto a downwardly-inclined screen positioned below the level of water in a tank. The screen was of such a size as to permit the impurities to pass while retaining the agglomerated particles. A further description of this apparatus and general method may be found in the patent to McCoy, No. 2,017,468. Four runs were conducted on this type process, runs number 1 and 2 reported below utilizing the conventional refined tall oil as a reagent, while runs 3 and 4 illustrate the use of the improved reagent (B. L. reagent) of the present invention in the agglomeration process:

*Reagents (pounds per ton of feed)*

|  | Run 1 | Run 2 | Run 3 | Run 4 |
|---|---|---|---|---|
| NaOH | 0.20 | 0.25 | 0.10 | 0.15 |
| Tall Oil | 0.36 | 0.45 |  |  |
| B. L. Reagent |  |  | 0.60 | 0.78 |
| Fuel Oil | 1.40 | 1.88 | 1.46 | 1.90 |

*Metallurgical results*

|  | Run 1 | Run 2 | Run 3 | Run 4 |
|---|---|---|---|---|
| Percentage Agglomeration Conc | 41.6 | 50.2 | 42.6 | 49.5 |
| Percentage Flotation Conc | 26.5 | 19.5 | 27.1 | 20.4 |
| Percentage Tailings | 31.9 | 30.3 | 30.3 | 30.1 |
| B. P. L. Agglomeration Conc | 74.93 | 74.72 | 74.72 | 74.13 |
| B. P. L. Flotation Conc | 74.00 | 73.08 | 73.76 | 73.30 |
| B. P. L. Tailings | 6.39 | 4.04 | 4.66 | 4.22 |
| $SiO_2$ Agglomeration Conc | 4.46 | 4.72 | 4.67 | 4.36 |
| $SiO_2$ Flotation Conc.* | 5.13 | 6.27 | 6.52 | 6.02 |
| Percentage B. P. L. Rec.—Agglomeration | 59.0 | 70.8 | 60.2 | 69.4 |
| Percentage B. P. L. Rec.—Flotation | 37.1 | 27.0 | 37.2 | 28.2 |
| Total Percentage B. P. L. Rec | 96.1 | 97.8 | 97.4 | 97.6 |

*Flotation concentrate was subjected to a silica flotation at further concentration.

EXAMPLE V

A further test of the agglomerating properties of phosphatic values was conducted using a Wilfly shaking table. In this test runs 1 and 2 show the results obtained when using the conventional refined tall oil as a reagent. Runs 3 and 4 illustrate the use of the black liquor soap skimming reagent of the present invention.

*Reagents (pounds per ton of feed)*

|  | Run 1 | Run 2 | Run 3 | Run 4 |
|---|---|---|---|---|
| NaOH | 0.20 | 0.25 | 0.10 | 0.15 |
| Tall Oil | 0.36 | 0.47 |  |  |
| B. L. Reagent |  |  | 0.58 | 0.78 |
| Fuel Oil | 1.40 | 1.85 | 1.39 | 1.80 |

Metallurgical results

|  | Run 1 | Run 2 | Run 3 | Run 4 |
|---|---|---|---|---|
| Percentage Concentrate | 66.6 | 70.5 | 68.1 | 69.9 |
| Percentage Midlings | 3.0 | 3.8 | 1.6 | 2.6 |
| Percentage Tailings | 30.4 | 25.7 | 30.3 | 27.5 |
| B. P. L. Concentrate | 74.68 | 71.74 | 74.77 | 73.68 |
| B. P. L. Midlings | 60.97 | 35.02 | 55.46 | 38.89 |
| B. P. L. Tailings | 6.63 | 6.32 | 5.67 | 4.61 |
| $SiO_2$ Concentrate | 4.02 | 8.07 | 3.92 | 5.31 |
| $SiO_2$ Midlings | 21.00 | 54.32 | 26.87 | 48.95 |
| Percentage B. P. L. Recovered Conc. | 92.8 | 94.5 | 95.2 | 95.9 |
| Percentage B. P. L. Recovered Midlings | 3.4 | 2.5 | 1.7 | 1.9 |
| Total Percentage B. P. L. Recovered | 96.2 | 97.0 | 96.9 | 97.8 |

EXAMPLE VI

It is noted that each of the foregoing examples deals with tests conducted using the black liquor soap skimming reagent at the preferred pH, 11.0–11.3. In the tests detailed below, the effect of the new reagent at a variety of pH levels all the way from 9.5 to 12.5 was investigated.

The deslimed phosphatic feed was subjected to flotation in the conventional fashion with a negative ion, phosphate selective reagent to produce a rougher concentrate. This rougher concentrate was redispersed and refrothed in a secondary flotation cell and the discharge from this cell subjected to a silica float with positive ion reagents. First, this procedure was followed using a conventional tall oil-fuel oil-caustic soda mixture. Then an additional seven runs were conducted using the reagent of this invention at pH's of 9.5, 10.0, 10.5, 11.0, 11.5, 12.0 and 12.5. The high pH levels were obtained by use of NaOH and low levels (below 11.5) by the use of no more than about 1% tall oil based upon the weight of the soap skimmings-water mixture. Sulfuric acid could also have been used to adjust the pH of the test reagents to low levels. The pH readings were secured from a Beckman "E" type electrode, the type recommended for making determinations in high alkaline ranges.

Reagents (pounds per ton of feed)

| Run 1 | | Runs 2 Through 8 | |
|---|---|---|---|
| NaOH | 0.25 | NaOH | 0.15 |
| Tall Oil | 0.233 | B. L. Reagent | 0.392 |
| Fuel Oil | 0.925 | Fuel Oil | 0.925 |
| $H_2SO_4$* | 3.00 | $H_2SO_4$* | 3.00 |
| NaOH* | 0.20 | NaOH* | 0.20 |
| Amine* | 0.06 | Amine* | 0.06 |
| Frother* | 0.06 | Frother* | 0.06 |

*These reagents are used in the silica flotation circuit.

trative purposes only, and any modifications desired in the procedure may be followed so long as the pH of the resulting reagent is within the range 9.5 to 12.5 and preferably within the range 11.0–11.3 and the specific gravity of the resulting mixture is about 1.02:

1,000 gallons of black liquor soap skimmings were mixed with 1,000 gallons of water. The water and soap skimmings were carefully mixed without violent agitation for a period of 10 minutes. This is necessary since violent agitation in mixing causes considerable air to be entrapped in the liquid, increasing the viscosity of the liquid, and making it very difficult to pump. Further, the soap skimmings, as received from the sulfate paper pulp mill, contain a considerable amount of black liquor which has a high caustic value. This black liquor must be mixed uniformly with the remainder of the product in order to obtain a reagent which will function satisfactorily in the mineral-recovery processes. The liquid soap thus formed was then adjusted to a pH of 11.1 and a specific gravity of 1.02. The reagent mixture was then used in the plant flotation of phosphate ore.

The pH of the reagent is extremely critical. Unless the pH is maintained within the range 9.5–12.5, it has been found very difficult to produce satisfactory results in mineral-recovery processes. Should the pH of the reagent drop below 9.5, the resulting product assumes a brown color and a sticky, paste-like consistency and can only be used after a further dilution. At high degrees of dilution, such a tremendous amount of reagent is required as to make its use impractical. Within the specified pH range, the mixture is dark colored, not too viscous and homogeneous. Here the solids content of the reagent is in the neighborhood of 35%–40%, which permits satisfactory results to be attained through the use of reasonable quantities of the reagent. Within the most preferred range of pH, the mixture is homogeneous and at its maximum fluidity. As the pH increases beyond 12.0, the mixture again becomes more viscous and above 12.5 soap begins to grain out. The product is very difficult to handle.

The term "black liquor soap skimmings" as used in the specification and appended claims covers the dark, viscous scum obtained, in the manner known to the art and described above, from the black liquor formed in the sulfate process of manufacturing paper and cellulose from wood. The term does not cover the product known as "tall oil" which is produced by acid treatment and other refining of the black liquor soap skimmings. The reagent formed from the black liquor soap skimmings has been referred to in the specification as "B. L. reagent."

Obviously, many modifications and variations of the

Metallurgical results

| Test Number | 1 | 2 | 3 | 4 | 5 | 6 | 7 | 8 |
|---|---|---|---|---|---|---|---|---|
| pH B. L. Reagent | Tall Oil | 9.5 | 10.0 | 10.5 | 11.0 | 11.5 | 12.0 | 12.5 |
| Percent Concentrates | 30.66 | 29.53 | 30.36 | 31.42 | 30.38 | 30.69 | 31.69 | 30.50 |
| Percent Silica Float Tailings | 6.90 | 6.52 | 8.65 | 7.48 | 8.17 | 9.14 | 9.15 | 10.75 |
| Percent Primary Float Tailings | 62.43 | 63.95 | 60.99 | 61.10 | 61.46 | 60.17 | 59.16 | 58.75 |
| B. P. L. Feed | 26.75 | 26.29 | 26.38 | 26.05 | 26.33 | 25.75 | 27.61 | 27.23 |
| B. P. L. Concentrates | 76.63 | 76.04 | 76.69 | 75.56 | 76.19 | 76.54 | 75.93 | 76.30 |
| B. P. L. Silica Float Tailings | 26.18 | 30.22 | 21.17 | 14.94 | 19.66 | 19.29 | 26.61 | 24.25 |
| B. P. L. Primary Float Tailings | 2.32 | 2.93 | 2.09 | 1.94 | 2.56 | 0.83 | 1.90 | 2.29 |
| $SiO_2$ Concentrates | 2.02 | 1.95 | 2.09 | 2.06 | 2.03 | 2.36 | 2.10 | 1.92 |
| Total Percent B. P. L. Recovered* | 87.81 | 85.40 | 88.25 | 91.13 | 87.92 | 91.23 | 87.14 | 85.46 |
| Percent B. P. L. Recovered in Primary Circuit | 94.58 | 92.89 | 95.19 | 95.43 | 94.03 | 98.06 | 95.94 | 95.05 |

*Recovery includes primary and silica float tailings.

As illustrated by the preceding examples, the reagent of the present invention, while much more inexpensive and easier to prepare than the conventional, refined tall oil, is equivalent, and in some respects superior, to the conventional refined tall oil when used in mineral-recovery processes.

The following description of the preparation of the reagent of the present invention is furnished for illusinvention as hereinbefore set forth may be made without departing from the spirit and scope thereof, and therefore only such limitations should be imposed as are indicated in the appended claims.

We claim:

1. An improved reagent for the recovery of oxides of alkaline earth metals from their ores which comprises: black liquor soap skimmings, produced as a by-product of the sulfate process for the manufacture of cellulose and paper, in water solution, said water solution of black liquor soap skimmings having a pH within the range 9.5–12.5.

2. An improved reagent for the recovery of oxides of alkaline earth metals from their ores which comprises: black liquor soap skimmings, produced as a by-product of the sulfate process for the manufacture of cellulose and paper, in water solution, said water solution of black liquor soap skimmings having a pH within the range 11.0–11.3.

3. An improved reagent for the recovery of oxides of alkaline earth metals from their ores which comprises: black liquor soap skimmings, produced as a by-product of the sulfate process for the manufacture of cellulose and paper, in water solution, said water solution of black liquor soap skimmings having a pH within the range 11.0–11.3 and a specific gravity of 1.02–1.03.

4. In a froth-flotation process of separating alkaline earth oxide ore values from the crude ore, the step which comprises: subjecting the ore to froth-flotation in the presence of a black liquor soap skimmings-water mixture having a ratio of soap skimmings to water of about 1:1, said soap skimmings-water mixture having a pH within the range 9.5–12.5.

5. The process of claim 4 wherein the ore treated is phosphatic ore.

6. In a froth-flotation process of separating alkaline earth oxide ore values from the crude ore, the step which comprises: subjecting the ore to froth-flotation in the presence of a black liquor soap skimmings-water mixture having a ratio of soap skimmings to water of about 1:1, said soap skimmings-water mixture having a pH within the range 11.0–11.3.

7. In the recovery of alkaline earth ore values from the crude ore by agglomeration, the step which comprises: subjecting said ore to the action of a black liquor soap skimmings-water mixture having a ratio of soap skimmings to water of about 1:1, said soap skimmings-water mixture having a pH within the range 9.5–12.5.

8. The process of claim 7 wherein the ore treated is phosphatic ore.

9. In the recovery of alkaline earth ore values from the crude ore by agglomeration, the step which comprises: subjecting said ore to the action of a black liquor soap skimmings-water mixture having a ratio of soap skimmings to water of about 1:1, said soap skimmings-water mixture having a pH within the range 11.0–11.3

10. In the recovery of alkaline earth ore values from the crude ore by agglomeration, the step which comprises: subjecting said ore to the action of a black liquor soap skimmings-water mixture having a specific gravity of about 1.02, said soap skimmings-water mixture having a pH within the range 11.0–11.3.

References Cited in the file of this patent

UNITED STATES PATENTS

| 2,249,569 | Phelps | July 15, 1941 |
| 2,466,671 | Gieseke | Apr. 12, 1949 |

FOREIGN PATENTS

| 532,866 | Great Britain | Feb. 15, 1941 |